US 6,591,305 B2

(12) United States Patent
Densmore

(10) Patent No.: US 6,591,305 B2
(45) Date of Patent: Jul. 8, 2003

(54) METHOD AND SYSTEM FOR DELIVERING DATA FROM A SERVER OBJECT TO A CLIENT OBJECT USING A NON-PROPRIETARY DATA TRANSFER PROTOCOL

(75) Inventor: Owen Densmore, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/107,536

(22) Filed: Jun. 30, 1998

(65) Prior Publication Data

US 2002/0062391 A1 May 23, 2002

(51) Int. Cl.⁷ ............................................. G06F 15/16
(52) U.S. Cl. ...................................... 709/245; 709/203
(58) Field of Search ................................ 709/245, 246, 709/200, 203, 217, 219, 229, 231; 345/354, 352; 713/200; 707/314

(56) References Cited

U.S. PATENT DOCUMENTS

| | | | | |
|---|---|---|---|---|
| 5,541,955 A | * | 7/1996 | Jacobsmeyer | 375/222 |
| 5,592,237 A | * | 1/1997 | Greenway et al. | 348/716 |
| 5,630,067 A | * | 5/1997 | Kindell et al. | 709/231 |
| 5,717,854 A | * | 2/1998 | Egawa et al. | 709/219 |
| 5,732,214 A | * | 3/1998 | Subrahmanyam | 709/227 |
| 5,737,747 A | * | 4/1998 | Vishlitzky et al. | 709/231 |
| 5,809,239 A | * | 9/1998 | Dan et al. | 709/203 |
| 5,928,323 A | * | 7/1999 | Gosling et al. | 709/203 |
| 5,928,330 A | * | 7/1999 | Goetz et al. | 709/231 |
| 5,956,716 A | * | 9/1999 | Kenner et al. | 707/10 |
| 5,958,016 A | * | 9/1999 | Chang et al. | 709/229 |
| 5,983,005 A | * | 11/1999 | Monteiro et al. | 709/231 |
| 5,987,454 A | * | 11/1999 | Hobbs | 707/4 |
| 5,991,306 A | * | 11/1999 | Burns et al. | 370/429 |
| 5,996,022 A | * | 11/1999 | Krueger et al. | 709/247 |
| 6,012,098 A | * | 1/2000 | Bayeh et al. | 709/246 |
| 6,023,731 A | * | 2/2000 | Chawla | 709/231 |
| 6,023,764 A | * | 2/2000 | Curtis | 713/200 |
| 6,028,605 A | * | 2/2000 | Conrad et al. | 345/354 |
| 6,061,504 A | * | 5/2000 | Tzelnic et al. | 709/219 |
| 6,065,043 A | * | 5/2000 | Domenikos et al. | 709/203 |
| 6,065,059 A | * | 5/2000 | Shieh et al. | 709/233 |
| 6,070,184 A | * | 5/2000 | Blount et al. | 709/200 |
| 6,073,168 A | * | 6/2000 | Mighdoll et al. | 709/217 |
| 6,085,252 A | * | 7/2000 | Zhu et al. | 709/231 |
| 6,092,120 A | * | 7/2000 | Swaminathan et al. | 709/247 |
| 6,094,673 A | * | 7/2000 | Dilip et al. | 709/202 |
| 6,100,906 A | * | 8/2000 | Asaro et al. | 345/539 |
| 6,128,623 A | * | 10/2000 | Mattis et al. | 707/100 |
| 6,138,162 A | * | 10/2000 | Pistriotto et al. | 709/229 |
| 6,138,163 A | * | 10/2000 | Nam et al. | 709/231 |
| 6,249,787 B1 | * | 6/2001 | Schleimer et al. | 707/10 |
| 6,249,794 B1 | * | 6/2001 | Raman | 707/500 |
| 6,256,620 B1 | * | 7/2001 | Jawahar et al. | 707/2 |
| 6,292,827 B1 | * | 9/2001 | Raz | 709/217 |
| 6,330,575 B1 | * | 12/2001 | Moore et al. | 707/513 |
| 6,356,283 B1 | * | 3/2002 | Guedalia | 345/760 |
| 6,363,478 B1 | * | 3/2002 | Lambert et al. | 713/151 |

* cited by examiner

*Primary Examiner*—Mark R. Powell
*Assistant Examiner*—Jason D. Cardone
(74) *Attorney, Agent, or Firm*—Sonnenschein Nath & Rosenthal

(57) ABSTRACT

The present invention is method and system capable of delivering video across the Internet using the hypertext transfer protocol. Client objects periodically request to view a uniform resource locator that is aliased to a servlet. For each request, the servlet retrieves and delivers a video image to the requesting client object. The invention can simultaneously deliver images to a variety of client objects, regardless of whether they are requesting the images at the same rate.

16 Claims, 4 Drawing Sheets

METHOD AND SYSTEM FOR DELIVERING DATA FROM A SERVER OBJECT TO A CLIENT OBJECT USING A NON-PROPRIETARY DATA TRANSFER PROTOCOL

BACKGROUND OF THE INVENTION

1. Field of the Invention

The present invention relates generally to the computerized delivery of data from a server object to a client object, and more specifically to a method and system for sequentially delivering video data to network clients while adhering to the hypertext transfer protocol.

2. Related Art

With the increased popularity of the Internet, a strong need has developed to provide a method and system for delivering video data across the World Wide Web. Developing such technology is difficult, however, because the hypertext transfer protocol, which defines the standard for delivering Web data, does not provide a protocol for the sequential delivery of images. As a result, a number of proprietary protocols have been developed. But from these, no single protocol has emerged as the de facto standard.

The reasons for this are many, but perhaps most important is that the computers connected to the Web subscribe to a variety of platforms. These differing platforms may include different operating systems, such as those promulgated and trademarked by UNIX, SUN MICROSYSTEMS (e.g., SOLARIS), IBM (e.g., OS/2), MICROSOFT (e.g., WINDOWS NT, WINDOWS 95, WINDOWS 3.1) and APPLE (e.g., MacOS, OS8). These operating systems have varying application program interfaces. Thus, video delivery software must be individually tailored to each API to run on the associated operating system—a costly and time consuming process.

Another impediment to the development of a consistent method of video delivery is that the computers connected to the Web vary greatly in terms of processing power. This variance is problematic because a protocol that works well with powerful computers may yield unsatisfactory results with computers having more limited power.

The prior art has not even attempted to create a universal delivery system. Instead, the most common approaches cater to computers that have substantial processing power or that are run under the more common operating systems. One such approach requires the installation of a "plug-in." This is illustrated in FIG. 1, which depicts a client computer 100 connected to a server computer 102 over the Internet 104. As shown, the computers connect to the Internet 104 via modems 106, although those skilled in the art will recognize that other forms of communication are possible, such as wireless hookups.

In addition to the modem 106, the client computer 100 has the standard array of components: a central processing unit 108; a user interface 110, which typically consists of a keyboard, a mouse, and a monitor; a primary memory 112, such as a random access memory, for program execution; and a secondary memory 114, such as a disk, for storing programs and data that are not immediately needed for execution. As illustrated, the server computer 102 contains the same array of basic computer components 108, 110, 114, with the exception of the user interface 110. Those skilled in the art will appreciate, however, that the server computer 102 could also possess such an interface.

The client and the server computers 100, 102 also each have an operating system 118 that is stored in the secondary memory 114 and loaded into the primary memory 112 to manage the respective computer's resources. For example, with respect to the client computer 100, the operating system 118 provides an application program interface that allows programs, such as the browser 120, to interact with the modem 106 so that communication may be made with the server computer 102. Similarly, the programs of the server computer 102, such as the proprietary video server 122, access the server computer's operating system 118 to communicate to the client computer 100.

The plug-in method requires the server computer 102 to install the proprietary video server 122 and requires the client computer 100 to install a proprietary plug-in 124. The proprietary server 122 retrieves video data 126 from the disk 114 of the server computer 102 and downloads it to the client computer 100. The plug-in 124 is then invoked on the client side to display the downloaded data 128. Plug-ins can be installed as stand alone programs, or, as shown in FIG. 1, can be installed "in-line" in a web browser 120. In advanced systems, the downloaded data 128 will be displayed using a process known as "streaming," which is a compression and buffering technology that allows the client computer 100 to display data in near real-time. If the server 102 is incapable of streaming data, the plug-in 124 displays the data 128 after it has been downloaded.

While the plug-in technique provides a capable method of delivering video data in certain environments, the technique has several disadvantages First, it requires the purchase of the proprietary server 122 and associated development tools to even create the video data 126. And because this data 126 is designed for use with a proprietary plug-in 124, it often does not conform to formats that are viewable under the hypertext transfer protocol. Thus, only those who have purchased the plug-in 124 can view the created video 126, 128. This purchase cost frequently represents more than a one-time investment because the proprietary protocol may require constant upgrades. Also, a newly emerging protocol may displace an old one, requiring the user to start anew.

Even if purchase costs do not represent a significant impediment to broad deployment of the media, other obstacles do. The installation of the plug-in 124 is often a complex procedure, and one made particularly difficult if the data is to be delivered through a secure gateway, sometimes referred to as a "firewall." Plug-ins also frequently require an elaborate infrastructure, such as repeaters, and can require more processing power than the client computer 100 can deliver. When this problem arises, the results can be merely unsatisfactory or nearly catastrophic. For example, when the modem 106 provides a limited bandwidth, the time required to download the video data may be so great that the user will abort the process in frustration. When the CPU 108 operates at a relatively low processing speed, or when the client computer 100 contains limited RAM 112, the video may appear as a disjointed sequence of images or may be displayed so slowly that the client computer 100 appears to have ceased its processing.

Attempts to improve upon the plug-in system have been only marginally successful. For example, one attempt has the client object sequentially accessing image files stored on the server's disk. In one version of this approach, the client object requests the image files at a rate independent of that which the server creates them. In this scheme, the client computer could request image files at a rate of two frames per second while the server computer retrieved images from a camera and stored them to disk at a rate of three frames per second. It was hoped that this rate decoupling would provide for efficient delivery because the client could control its use of network bandwidth. Unfortunately, the technique introduced fatal timing errors: Because the client requested data at a rate independent of the server, requests for image files occurred while the data server was updating the needed image, e.g., when the server was storing or retrieving images to and from the disk. As a result, the data server would return a "File not Found" message that caused some servers to permanently suspend the exchange of data. In colloquial terms, this is known as "crashing" and, next to the destruction of data, is the most undesirable result that a communication error can produce.

To avoid such errors, some methods deliver video data using casting technologies, such as the "PUSH" hypertext transfer protocol extension that is proprietary to NETSCAPE. This extension allows for the delivery of data across a network channel at a speed dictated by server software. While this can be efficient for some systems, it is inadequate for those with limited processing power because the client computer cannot reduce the rate at which it must receive the data. This can be particularly problematic in cases where the receiving computer is connected to a local area network. In this case, the receiving computer can monopolize the network's bandwidth, which can cause other computers connected to the LAN to experience delays when accessing network resources. The PUSH approach is also not broadly deployable because, like the plug-in approach, it requires the purchase of proprietary software, i.e., proprietary server software. The deployability is further limited by the fact that PUSH and other webcasting technologies are proprietary HTTP extensions. As such, they are not supported by all web browsers, and therefore some browsers are simply unable to receive "pushed" data.

Thus, there has been a long standing need for technology that can reliably deliver video data to client computers that operate on differing platforms and have varying degrees of processing power. There is also a compelling need to deliver the data using a manner that minimizes investments in proprietary software. The present invention satisfies these needs.

INVENTION SUMMARY

Embodiments of the invention deliver video data from a server object to numerous client objects without deviating from the standards set by the hypertext transfer protocol. These embodiments are therefore widely deployable because they do not require the client objects to install proprietary software. This deployability is further enhanced because the embodiments allow the client objects to control their use of network bandwidth by defining their respective data delivery rates. Thus, even client computers with limited processing power can efficiently utilize the invention.

One aspect of one of these embodiments is the decoupling of the client objects' data delivery rates from the server object's data collection rate. That is, while the server object delivers data at the rates requested by the client objects, it retrieves data at a rate independent from those delivery rates. By maintaining an inventory of the undelivered data in random access memory, the server object can quickly deliver the data to clients that are requesting it at differing rates.

An embodiment of the invention utilizes a servlet to extend the data delivery capabilities of a server computer. Client objects request to view data by accessing a Uniform Resource Locator that is aliased to the servlet. Because this URL is accessible to the client objects regardless of whether the servlet is retrieving new data or otherwise maintaining the undelivered data inventory, the invention provides for more reliable delivery than was before possible.

BRIEF DRAWING DESCRIPTIONS

The accompanying drawings illustrate embodiments of the invention that will enable those skilled in the art to make and utilize the invention. In fact, these drawings, when considered with the written disclosure, will enable those skilled in the art to modify these embodiments in a manner that does not depart from the spirit and scope of the invention.

DETAILED DESCRIPTION

Embodiments of the invention will now be described with reference to the accompanying drawings. It is understood that the invention is not limited to these embodiments, as the teachings contained herein will enable others to modify these embodiments without departing from the spirit and scope of the invention. Accordingly, the invention encompasses all such modifications that are described by the appended claims and their equivalents.

Figure 1:
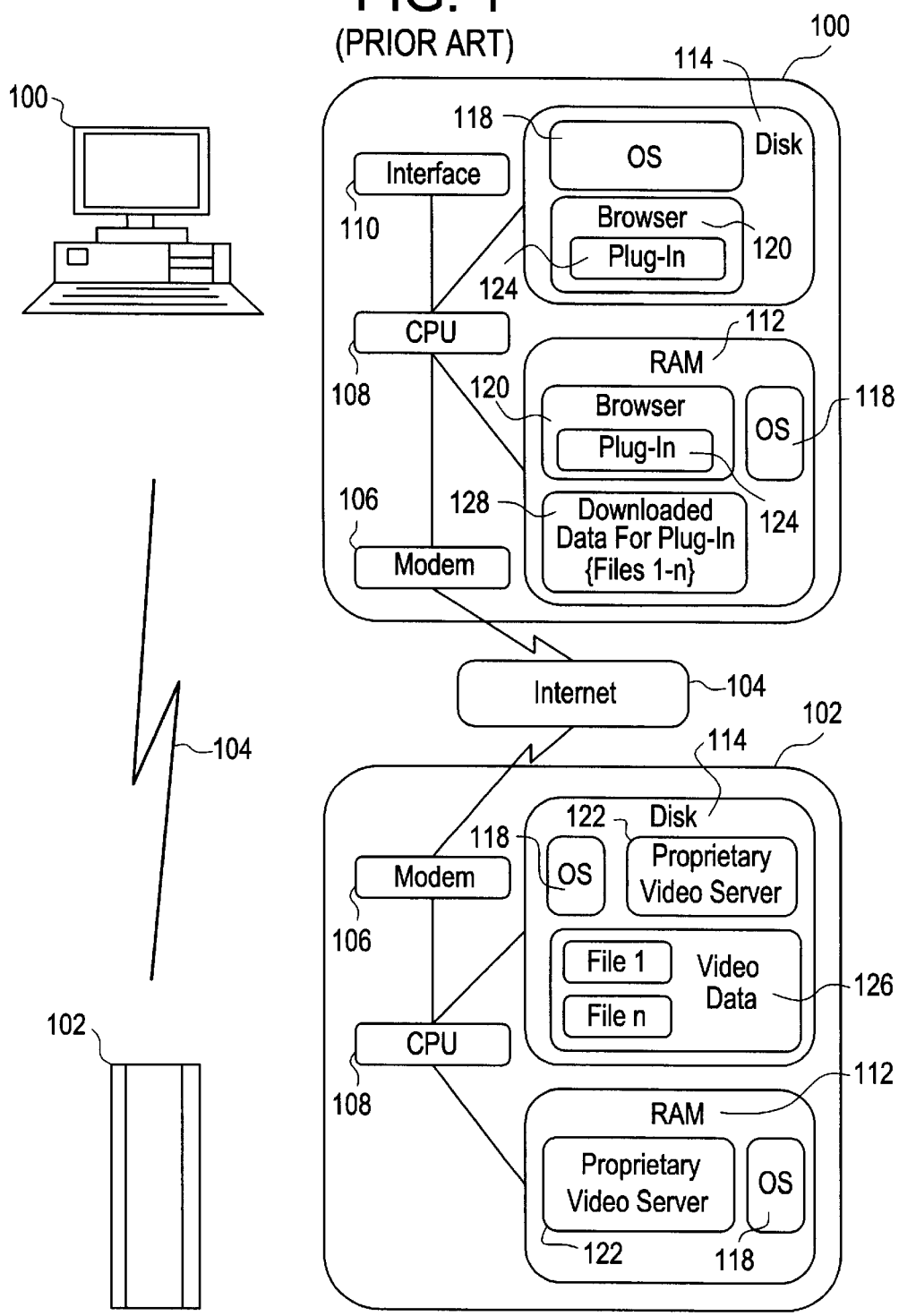
FIG. 1 illustrates a prior art server computer connected to a client computer via the Internet.
Figure 2:
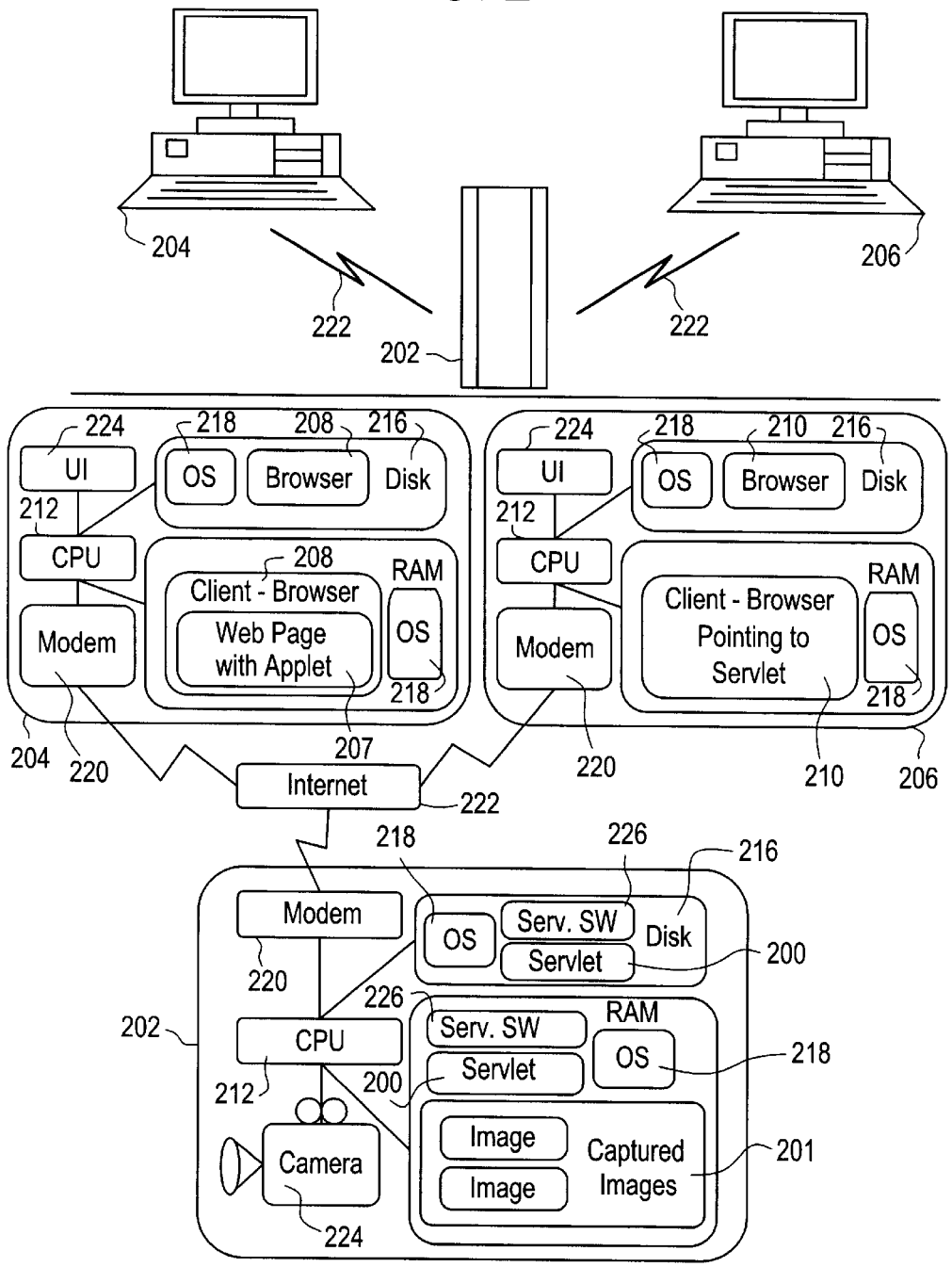
FIG. 2 depicts a server computer that delivers data to two client computers in accordance with an embodiment of the present invention.

One embodiment of the present invention is a method and system for delivering data from a server object to a client object. In FIG. 2, an embodiment is shown where the server object is a servlet 200 that delivers a series of video images 201 from a server computer 202 to two client computers 204, 206.

A servlet 200 is a dynamically loadable object that extends the functionality of the server computer 202. The client computers 204, 206 access the servlet 200 in related, but different ways. The first client computer 204 accesses the servlet 200 via an applet 207 that is embedded in a web page, which is viewed by a web browser 208. The applet 207 is a program that is run within the browser 208. Thus, the applet 207 is similar to the servlet 200 in that both extend the functionality of their host computers. The second client computer 206 also accesses the servlet 200 via a web browser 210, but does so by pointing the browser 210 to a uniform resource locator that is aliased to the servlet 200. Although the client computers 204, 206 depicted here utilize web browsers, those skilled in the art will appreciate that the invention could be deployed with any browsing technology objects, such as dynamically linked libraries that contain browsing like functions.

The server and client computers 202, 204, 206 each have the standard computer components for storing data and executing programs: namely, central processing units 212, primary memory (e.g., RAM) 214, secondary memory (e.g., a disk) 216, and operating systems 218. Those skilled in the art will appreciate that the present invention is not limited to any particular CPU 212 or processing technology. Nor is the invention limited to any particular operating system 218, as the invention could be utilized in any operating environment, such as WINDOWS 95, WINDOWS 98, UNIX, MacOS, or any JAVA runtime environment. "JAVA runtime environment" refers to the operating environment typified by a JAVA virtual machine and associated JAVA class libraries. JAVA is a registered trademark of SUN MICROSYSTEMS, Inc.

The computers 202, 204, 206 also have modems 220 for communicating with each other over a network 222. As pictured here, the network 222 is the Internet. Those skilled in the art will understand, however, that embodiments could be deployed across any wide or local area network. The clients have user interfaces 224 that are comprised of a keyboard, a mouse, and a monitor. Although not shown, those skilled in the art will realize that the server computer 202 could also be equipped with a user interface. The server computer 202 has a camera 224 that operates as a data source to produce the images 201 that are delivered by the servlet 200. In another embodiment, a file of images stored in the secondary memory 216 of the server computer 202 constitutes the data source. The server computer 202 is also equipped with server software 226 that invokes the servlet 200.

In one embodiment, the applet 207 and the servlet 200 are written in JAVA, to run in the JAVA runtime environment. The preferred server software 226 is the JAVASERVER, which like the JAVA runtime environment, was developed and trademarked by SUN MICROSYSTEMS. The JAVA runtime environment is preferable because of its platform independence: A compiled JAVA object can be executed on any system that runs the JAVA virtual machine, which is not dependent on any particular CPU, processing technology, or operating system. Consequently, a JAVA software developer can create code more efficiently than developers that code in other languages.

Most browsers run the JAVA virtual machine and therefore can execute JAVA applets. Thus, embodiments that utilize the JAVA applet 207 will be ideal for most systems. But this not to say that the applet 207 must be written in JAVA. On the contrary, because the servlet 200 is aliased as a URL, applets written in any language can access the servlet 200.

The servlet 200 could be written in other languages as well, such as C++, or a language employing Common Gateway Interface Scripting. These alternatives to JAVA, however, are less than ideal due to their lack of portability and increased overhead. C++ for example tends to be more bug-ridden than JAVA, and CGI scripting tends to be more complex. CGI also requires the creation and maintenance of a CGI bin, which may require reconfiguration of the server computer. And for security reasons, access to the bin is often not granted to all server objects. Therefore, CGI scripting might not be a possibility for a particular developer. CGI scripting also imposes performance-based penalties that JAVA does not. More specifically, a JAVA servlet once launched is persistent: once it has been launched, it remains resident in memory to fulfill all of its requests. In contrast, CGI technologies generally require distinct processes to be built and released for each individual request. This repetitive construction greatly slows data delivery. And while some CGI extension technologies have attempted to eliminate this overhead, they are far less portable than JAVA servlets. This is because Java servlets are platform independent. The same cannot be said for CGI extensions, which generally must be separately compiled to run on differing platforms.

To illustrate the advantages of JAVA, consider the following experiment that was conducted using an embodiment of the invention. A video delivery servlet was created and installed on a standard desktop computer—not on a heavy duty server. Viewers from within SUN MICROSYSTEMS were asked to access the servlet's URL to receive video data, which the desktop captured from a video tuner at a rate of 5 frames per second. The clients used a maximum viewing rate of 5 frames per second; the frames comprised approximately 40 kilobytes. Under these conditions the desktop delivered over 100 kilobyte frames per second to more than ten clients. Of course, this delivery rate does not represent the pinnacle performance that the invention is capable of, given that a standard desktop computer was used as a server. Nonetheless, it does illustrate the invention's potential. Indeed, by utilizing the inventive properties disclosed herein, a 10–15 frame per second client viewing rate is possible. And as computers' processing power improves, this rate is likely to further increase.

Regardless of what language the servlet is written in or what server software 226 it interfaces with, the servlet 200 can be accessed with or without the applet 207. And regardless of how it is accessed, the servlet 200 delivers images 201 to the client browsers 208, 210 in a format compatible with the hypertext transfer protocol. Thus, this embodiment is widely deployable because it delivers video data to client objects without forcing them to purchase and install proprietary viewing software. This embodiment also helps solve the problem of bandwidth adaptability while ensuring reliable data delivery. The fatal "File not Found" errors that plague other systems are avoided because the servlet 200 that the client objects 207, 208, 210 access to request video images 201 is aliased to a URL, which is a stable location indicator that can be readily accessed. This is true regardless of whether the servlet 200 is creating a new image or otherwise updating the images 201.

Figure 3:
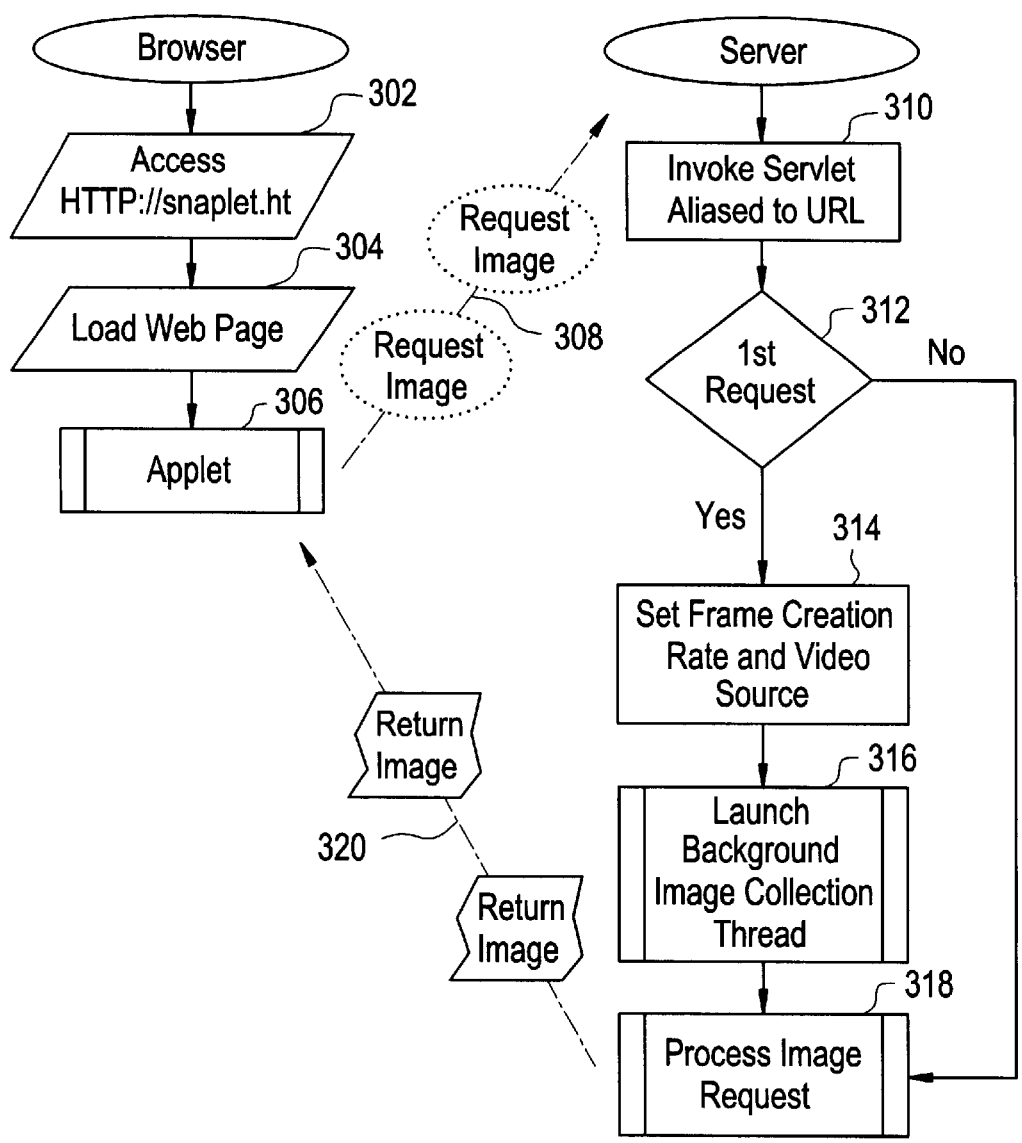
FIG. 3 is a flow chart of the interactions between a browser program and a server object in an embodiment of the present invention.

The interactions between the browser 208 and the server software 226 are shown in FIG. 3. The process begins when the browser accesses a webpage (i.e., snaplet.html) stored on the server computer 202 (302). The browser loads the web page, which contains the applet 207 (304). The browser then launches the applet 207, which requests images by accessing the servlet's URL (306, 308). In turn, the server software 226 invokes the servlet 200 to satisfy the browser's 208 request (310). If this is the first request, the server software designates the data source and the frame creation rate, or capture rate, before returning the current image to the browser (312, 314, 316, 318, 320). On subsequent requests, the current image is returned immediately (312, 318, 320). By making repeated requests to the servlet's URL, numerous images are delivered to the browser (308, 318, 320).

Figure 4:
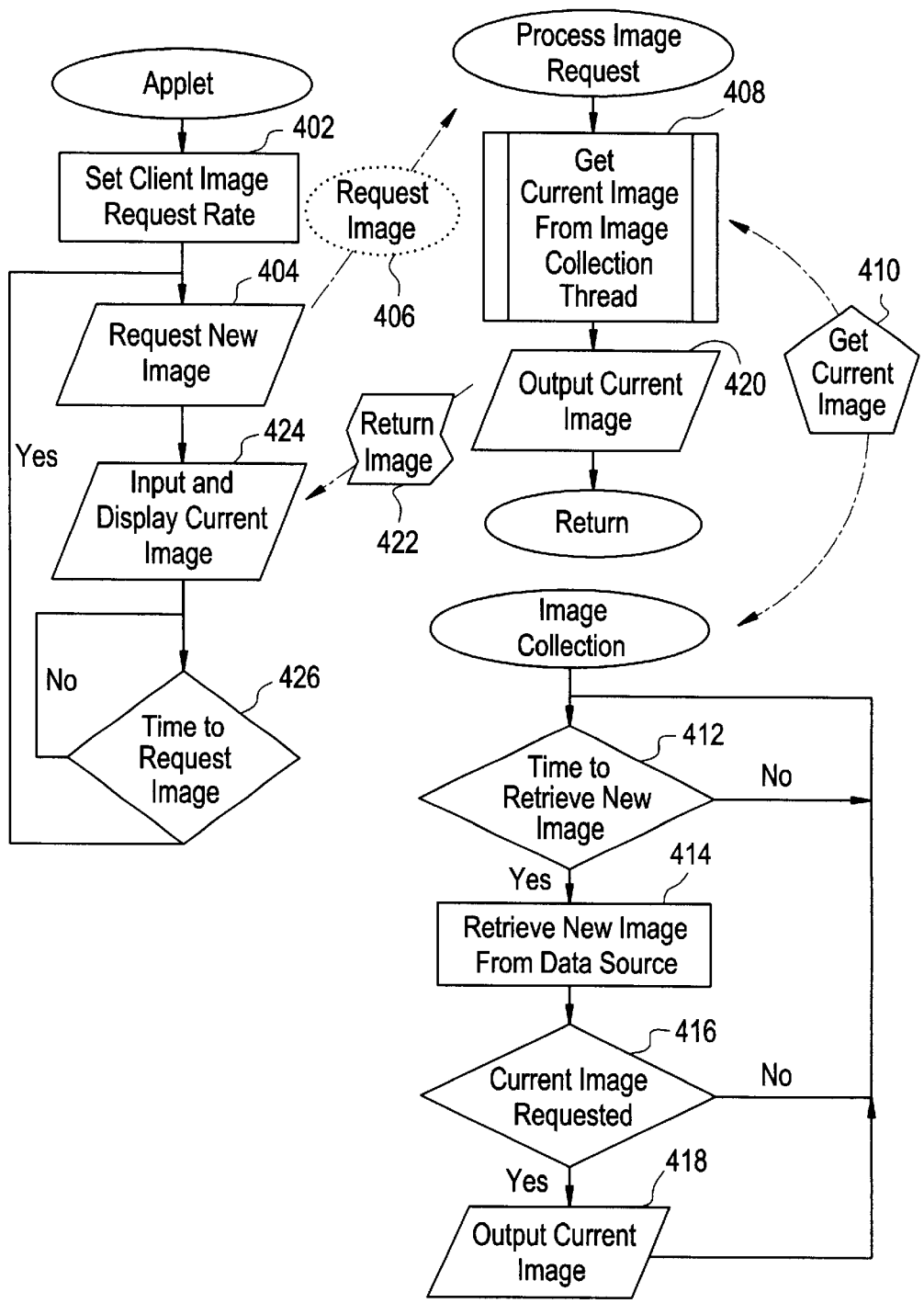
FIG. 4 is a flow chart of the interactions between an applet and two server threads in accordance with an embodiment of the present invention.

The manner in which these images are returned is illustrated in detail in FIG. 4, which shows the interactions between the applet and the two server threads referenced by blocks 316 and 318. Basically, the applet interfaces with a "Process Image Request" thread that in turn interfaces with a background "Image Collection" thread. More specifically, the Image Collection thread constantly retrieves new images from the data source 224. The Image Collection thread delivers the current image to the Process Image Request thread upon demand. This latter thread then delivers the current image to the client applet. When more than one client requests images, a set of Process Image Request threads is created: Each thread of this set maintains current state information for its client. When all clients have viewed a particular image, the embodiment disposes of that image via JAVA's garbage collector.

The interactions between the applet 207 and the server threads begin when the applet 207 sets the rate at which it will request images from the servlet (402). The applet 207 then requests an image by accessing the servlet's 200 URL (404, 406). As explained with reference to FIG. 3, this first request launches the two server threads illustrated in FIG. 4 (316, 318). The Process Image Request thread retrieves the current image by interfacing with the Image Collection thread (408, 410). The Image Collection thread operates in the background, continuously retrieving current images from the data source at a rate defined by the image capture rate (412, 414, 314). Images are output to the Process Image Request thread upon request (416, 418). In turn, the Process Image Request thread returns the current image to applet 207 (420, 422). The image is then displayed on the client browser, and the process repeats itself (424, 426). Because the images are passed in an HTTP format, a proprietary reader is not required.

An important aspect of an embodiment of the invention is the flexibility that is derived from the three independent image delivery rates that FIG. 4 illustrates, i.e., the capture rate of the Image Collection thread, the service rate of the Process Image request thread, and fetch rate of the applet. Because the capture rate is independent of the fetch rates, the collection of images is not hampered by clients that lack processing power. Nor is it hampered by situations in which many clients are requesting images: the images are collected at the constant capture rate and are served to the clients at their various fetch rates.

Another advantage of an embodiment of the invention is that the images are maintained in server computer's RAM 202, 214. By maintaining the images in RAM, the embodiment delivers images 201 two or three times faster than conventional systems that maintained images on disk.

An embodiment will now be described with reference to a particular implementation, i.e., that of a "VCR style" image delivery system. The implementation details that follow are not meant to limit the invention, but are included to provide the fullest possible disclosure.

As explained above, it is necessary to define the servlet's 200 image capture rate and data source (314). The capture rate is typically set in the range of 2–4 frames per second, the chosen value being selected based on the server computer's 202 processing power and by the performance characteristics desired by the servlet's 200 developer. The data source specifies the location from which the servlet retrieves video frames. This parameter can be set to retrieve the images from a camera 224 or from a data file residing on the disk 216 of the server computer 202. The rate and source parameters are specified in an initial arguments file that is referenced when the servlet is compiled. For example, a servlet compiled with the initialization arguments:

video=snapshots.JPEG rate=4 would retrieve images from a file named "snapshots.JPEG" at a rate of 4 frames per second. Similarly, a servlet complied with the initialization arguments:

video=videocard|videoport|0.25|25 rate=2 would retrieve images from a videocard at the rate of 2 frames per second. In the above example, the parameters that follow the videoport are scale and image quality.

Once compiled, the servlet 200 is invoked by specifying its class name. For example, where the servlet 200 is named "SnapServlet," it would be invoked with the command:

http://server_host_name/servlet/SnapServlet

This URL can be invoked by simply pointing a browser 210 to the servlet 200. Preferably, however, the URL is accessed by running an applet 207 from within a browser 208. By invoking the Servlet in this fashion, images can be sequentially delivered with a minimal amount of user input: The browser 208 automatically executes the applet 207 when loading the web page (304, 306, 308).

An example of applet syntax that causes the browser 208 to invoke the servlet in the "VCR style" is:

<applet code="Snapshot.class" width=400 height=300
   <param name=file value=http://skunks.eng/servlet/
     SnapServlet|1.0|10>"
   <param name=rates value="0.25|0.5|0.75|1|2|4">
   <param name=scales value="0.5|1|1.5|2">
   <param name=controls value="South">
   <param name=labels value=
     "Resume|Pause|Seconds|Scale">
</applet>

In this example, the file parameter directly relates to the servlet. The remaining parameters configure the applet menus and buttons and specify where these buttons are placed relative to the video (i.e., South). For completeness, these parameters are explained here.

The "applet code" tag informs the browser 208 to invoke the applet denominated as "Snapshot.class." The width and height parameters define the size of the displayed image.

The "file" parameter specifies that the applet 207 is to be run using "http://skunks.eng/servlet/SnapServlet" as its file source. This file source is not a traditional image file, but a URL alias for the servlet 200. This alias allows client computers 204, 206 to access the servlet 200, and hence the images 201, even when the servlet 200 is updating the requested image. The numbers that follow the "file" parameter, "1" and "10," define the default image scale and the number of seconds between the client's image requests.

The "rates" parameter provides a list of user-selectable image viewing rates, in images per second. For example, the 0 25 rate sets the fetch rate as one frame for every four seconds. Thus, the client computer 204 is programmed to retrieve images 201 at a rate independent of that which the servlet 200 creates the images 201. Because the rate is selectable, the client can control its use of network bandwidth.

The "scales" parameter provides a number of scaling sizes and is used to increase or decrease the size of the image. This feature provides flexibility while preserving bandwidth: small files that are transferred from the server can be enlarged by the browser. When the scales string is left empty, no scaling options are provided.

The "controls" parameter defines the location of "resume," "pause," and "scale" controls, as well as the seconds display. The "labels" parameter defines the labels for start, stop, rate, and scale buttons.

During execution, the applet 207 makes a series of calls to the servlet's URL (i.e., http://skunks/.eng/servlet/SnapServlet) (308, 406). The servlet 200 intercepts these requests, processes them, and returns the corresponding images (318, 422). In this manner, the servlet 200 sequentially provides the browser 208 with images from the data source 224 (See FIGS. 3 and 4). The applet 207 and the servlet 200 continue their processing steps until the images are exhausted or until the user pauses or terminates the applet 207.

The above description outlines the embodiment in which the browser 208 possesses JAVA capabilities. If the browser lacks these, it nevertheless can view the images 201 by pointing to the URL that is aliased to the servlet 200 (i.e., http://skunks.eng/servlet/SnapServlet). The servlet 200 intercepts the URL request and returns the next unviewed image to the browser 210. Subsequent unviewed images are returned whenever the user depresses the browser's 210 refresh control, which triggers a new URL request.

Thus, with a single servlet 200, the present invention provides a delivery system that can be used with all Web browsers, regardless of the client computers' restrictions in processing power and use of network bandwidth. Morever, because the servlet 200 creates a new Process Image Request thread for each client browser 208, 210, many browsers can simultaneously view the images 201. The servlet 200 maintains in RAM 202, 214 any image that has yet to be viewed by a browser 208, 210. When all browsers 208, 210 have viewed a particular image, it is deallocated from the server's RAM 202, 214, preferably using JAVA's garbage collector.

As the inventive properties disclosed herein can be employed in a variety of contexts, the scope of the invention should not be limited to the particular embodiments described here. For example, although the above embodiments were described with reference to an image format that complies with the HTTP protocol, i.e., JPEG. Those skilled in the art will appreciate, however, that the invention can be employed with any data format that adheres to this protocol, e.g., HTML text file, Multi-purpose Internet Mail Extension, and Internet audio.

Similarly, although the servlet and server software were described as present in RAM and on a hard disk, those skilled in the art will recognize that the server objects could be stored and invoked from any media that can store data or have data read from it. Examples of such media include floppy disks, magnetic tapes, phase discs, carrier waves sent across a network, and various forms ROM, such as DVDs and CDs. Thus, the present invention anticipates the use of all computer readable media.

The inventive properties could also be employed to effectuate a video conference. Each party's local computer would remotely run an applet that references a servlet tied to the other party's data source, typically a camera.

Further, the invention could be used for security purposes. Surveillance over an area could be maintained by installing an camera at a web site and using the servlet to distribute data to a wide area.

Those skilled in the art will also appreciate that the above invention is not limited to the delivery of images or text that creates an illusion of movement. For example, the technology disclosed herein could also be used to create a facsimile server.

The above detailed description will enable those skilled in the art to make numerous modifications to the described embodiments without departing from the spirt and scope of the claimed invention. Indeed, the chosen embodiments were selected so others could best utilize the invention by making such modifications to tailor the invention to their particular needs. The description therefore should not be read as limiting the invention to the embodiments explained herein. Rather, the scope of the invention is intended to be defined by the appended claims and their equivalents.

What is claimed is:

1. In a computerized system, a method for serving, to a client, video data objects from a plurality of video data objects, the method comprising:

providing a uniform resource locator that is aliased to a servlet so that when the uniform resource locator is accessed, the servlet is invoked;

receiving, from the client, a first call to the uniform resource locator;

upon receipt of the first call, invoking the servlet to select a first video data object from the plurality of video data objects;

returning the selected first video data object to the client;

receiving, from the client, a second call to the uniform resource locator;

upon receipt of the second call, invoking the servlet to select a second video data object from the plurality of video data objects, the second video data object being ordered after the first video data object of the plurality of data objects; and returning the selected second video data object to the client.

2. The method of claim 1, further comprising:

providing for the client to select a rate at which the client calls the uniform resource locator; and providing for a data collection thread that retrieves the plurality of video data objects from a data source at a rate that is independently selected from the rate at which the client calls the uniform resource locator.

3. The method of claim 2, further comprising:

providing for an independent selection of a rate at which the selected first and second video data objects are returned to the client, this rate being independent from both the rate at which the client calls the uniform resource locator and the rate that the data collection thread retrieves the plurality of video data objects from the data source.

4. The method of claim 1 wherein the video data objects are of a format capable of being delivered using the hypertext transfer protocol.

5. The method of claim 1, further comprising:

retrieving the first video data object from a data source;

storing the retrieved first video data object in a random access memory;

retrieving the second video data object from the data source;

storing the retrieved second video data object in the random access memory; and after storing the first and the second video data objects in the random access memory, receiving the first call from the client.

6. The method of claim 5, further comprising:

providing for the client to select a rate at which the client calls the uniform resource locator; and providing for a data collection thread that retrieves the plurality of video data objects from a data source at a rate that is independently selected from the rate at which the client calls the uniform resource locator.

7. The method of claim 1 wherein a non-proprietary data transfer protocol is used to return the selected first and second video data objects to the client.

8. A computerized system for serving data objects to a client, the system comprising:

means for providing a location indicator that is aliased to a servlet so that when the location indicator is accessed, the servlet is invoked;

means for receiving, from the client, a first call to the location indicator;

upon receipt of the first call, means for invoking the servlet to select a first data object;

means for returning the selected first data object to the client;

means for receiving, from the client, a second call to the location indicator;

upon receipt of the second call, means for invoking the servlet to select a second data object, the second data object being ordered, after the first data object from among a plurality of data objects; and means for returning the selected second data object to the client.

9. The system of claim 8 wherein the servlet selects the first and second data objects with the aid of a first processing thread and a second processing thread, the first processing thread collecting data objects from a data source, and the second processing thread interfacing with the first processing thread to determine the data object that is needed to be delivered to the client.

10. The system of claim 9 wherein the first processing thread collects the data objects at a rate that is independent from a rate at which the servlet returns the first and second data objects to the client.

11. The system of claim 10 wherein the second processing thread also interfaces with the client by providing the means for receiving, from the client, the second call to the location indicator, the means for receiving the second call allowing for receipt of calls at a rate that is independent both of the rate at which the first processing thread collects the data objects and the rate at which the servlet returns the first and second data objects to the client.

12. The computerized system of claim 8 wherein the means for returning the selected first data object to the client comprises a non-proprietary data transfer protocol and the means for returning the selected second data object to the client comprises the non-proprietary data transfer protocol.

13. The system of claim 12 wherein the servlet selects the data objects with the aid of a first processing thread and a second processing thread, the first processing thread collecting data objects from a data source, and the second processing thread interfacing with the first processing thread to determine the data object that is needed to be delivered to the client and wherein the first processing thread collects the data objects at a rate that is independent from a rate at which the servlet returns the first and second data objects to the client.

14. The system of claim 13 wherein the second processing thread also interfaces with the client by providing the means for receiving, from the client, the second call to the location indicator, the means for receiving the second call allowing for receipt of calls at a rate that is independent both of the rate at which the first processing thread collects the data objects and the rate at which the servlet returns the first and second data objects to the client.

15. The system of claim 9 wherein the second processing thread also interfaces with the client by providing the means for receiving, from the client, the second call to the location indicator.

16. The system of claim 8 wherein the data objects are of a format capable of being delivered using the hypertext transfer protocol.

* * * * *